(12) United States Patent
Benarous et al.

(10) Patent No.: US 10,320,183 B2
(45) Date of Patent: Jun. 11, 2019

(54) CONTROL STRATEGY OF A DUAL LANE FAULT TOLERANT PERMANENT MAGNET MOTOR TO REDUCE DRAG TORQUE UNDER FAULT CONDITION

(71) Applicant: Goodrich Actuation Systems Limited, Solihull, West Midlands (GB)

(72) Inventors: Maamar Benarous, Balsall Common (GB); Jiang Li, Birmingham (GB)

(73) Assignee: GOODRICH ACTUATION SYSTEMS LIMITED, Solihull, West Midlands (GB)

( * ) Notice: Subject to any disclaimer, the term of this patent is extended or adjusted under 35 U.S.C. 154(b) by 0 days.

(21) Appl. No.: 15/229,442

(22) Filed: Aug. 5, 2016

(65) Prior Publication Data
US 2017/0047728 A1    Feb. 16, 2017

(30) Foreign Application Priority Data

Aug. 10, 2015   (EP) ..................................... 15180405

(51) Int. Cl.
| | | |
|---|---|---|
| *H02H 7/08* | (2006.01) | |
| *H02H 7/093* | (2006.01) | |
| *H02P 29/032* | (2016.01) | |
| *H02H 3/02* | (2006.01) | |
| *H02P 27/06* | (2006.01) | |

(52) U.S. Cl.
CPC ............ *H02H 7/093* (2013.01); *H02H 3/023* (2013.01); *H02P 27/06* (2013.01); *H02P 29/032* (2016.02)

(58) Field of Classification Search
CPC ........... H02M 1/32; H02M 2001/0006; H02M 7/493; H02M 7/537; H02M 7/5387; H02M 2001/0009; H02M 2001/0074; H02M 2001/325; H02M 2001/327; H02M 7/46;
(Continued)

(56) References Cited

U.S. PATENT DOCUMENTS 5,469,351 A * 11/1995 Masrur ................ H02H 7/0858
                                                        363/37
6,054,818 A *  4/2000 Tabata ................. B60K 7/0007
                                                        318/139
(Continued)

FOREIGN PATENT DOCUMENTS

EP          0588628 A1    3/1994
WO       2014177907 A1   11/2014

OTHER PUBLICATIONS

European Search Report for Application No. 15180405.1-1806 dated Feb. 2, 2016; 8 Pages.

*Primary Examiner* — Erick D Glass
(74) *Attorney, Agent, or Firm* — Cantor Colburn LLP

(57) ABSTRACT

A motor drive circuit comprising two or more inverters to provide current to a permanent magnet motor. Each inverter includes a respective switch arm comprising one or more switches for each phase of the motor to be driven. The motor drive circuit includes means for detecting a switch short circuit for any switch within one of the inverters and means for determining the speed of the motor. The motor drive circuit further includes a controller configured to short circuit each switch arm of the inverter containing the switch short circuit if the motor speed exceeds a predetermined threshold, but not if the motor speed does not exceed the predetermined threshold.

3 Claims, 6 Drawing Sheets

(58) Field of Classification Search
CPC .............. H02M 7/48; H02M 7/53871; H02M 7/53873; H02M 7/797
USPC .................................................. 318/400.21
See application file for complete search history.

(56) References Cited

U.S. PATENT DOCUMENTS

| | | | |
|---|---|---|---|
| 6,239,566 B1 | 5/2001 | Tareilus et al. | |
| 6,683,435 B1* | 1/2004 | Liang | B60L 3/0023 318/400.01 |
| 7,227,331 B2* | 6/2007 | Galli | D06F 37/42 318/805 |
| 7,279,862 B1* | 10/2007 | Welchko | B60L 3/0061 318/563 |
| 7,554,276 B2* | 6/2009 | Galli | H02M 1/32 307/64 |
| RE42,200 E* | 3/2011 | Welchko | B60L 3/0061 318/563 |
| 8,040,081 B2* | 10/2011 | Shimana | B60W 20/40 180/65.285 |
| 9,130,489 B2* | 9/2015 | Kitano | B60L 3/003 |
| 9,647,603 B2* | 5/2017 | Koseki | B62D 5/0484 |
| 2006/0181239 A1* | 8/2006 | Galli | D06F 37/42 318/805 |
| 2007/0063661 A1* | 3/2007 | Galli | H02M 1/32 318/109 |
| 2009/0096394 A1* | 4/2009 | Taniguchi | H02M 1/32 318/400.09 |
| 2010/0036555 A1* | 2/2010 | Hosoda | B60L 3/003 701/22 |
| 2010/0060222 A1* | 3/2010 | Kezobo | G01R 31/42 318/490 |
| 2010/0263953 A1* | 10/2010 | Shimana | B60K 6/26 180/65.285 |
| 2011/0043152 A1* | 2/2011 | Kidokoro | B62D 5/04 318/490 |
| 2011/0133677 A1* | 6/2011 | Franke | B60L 11/1887 318/400.3 |
| 2011/0241589 A1* | 10/2011 | Danjo | B60L 3/003 318/453 |
| 2012/0075761 A1* | 3/2012 | Miura | H02M 1/32 361/93.1 |
| 2012/0146567 A1* | 6/2012 | Iwaji | H02P 29/02 318/504 |
| 2012/0153719 A1* | 6/2012 | Inaba | B60L 3/003 307/10.1 |
| 2013/0009580 A1* | 1/2013 | De Wergifosse | H02P 29/032 318/400.26 |
| 2013/0026968 A1* | 1/2013 | Tagome | H02M 7/797 318/724 |
| 2013/0094266 A1* | 4/2013 | Balpe | H02P 27/08 363/131 |
| 2013/0121051 A1* | 5/2013 | Weiss | H02H 7/09 363/131 |
| 2013/0187585 A1* | 7/2013 | Niemann | B60L 3/003 318/400.21 |
| 2013/0207586 A1* | 8/2013 | Hayashi | H02P 25/22 318/490 |
| 2013/0271056 A1* | 10/2013 | Bunte | F03D 7/0224 318/503 |
| 2013/0314014 A1* | 11/2013 | Tremel | H02M 7/53871 318/400.22 |
| 2013/0320903 A1* | 12/2013 | Aalund | G01R 31/343 318/490 |
| 2014/0009093 A1* | 1/2014 | Suzuki | H02P 21/0096 318/400.02 |
| 2014/0077736 A1* | 3/2014 | Donner | H02H 7/1225 318/400.21 |
| 2014/0077745 A1* | 3/2014 | Kinouchi | H02M 1/32 318/514 |
| 2014/0097776 A1* | 4/2014 | Hayashi | H02P 6/20 318/400.21 |
| 2014/0132190 A1* | 5/2014 | Kitano | B60L 3/003 318/400.22 |
| 2014/0191700 A1* | 7/2014 | Eberlein | B60L 3/0061 318/504 |
| 2016/0200355 A1* | 7/2016 | Mori | B62D 5/0484 180/446 |
| 2016/0311462 A1* | 10/2016 | Inada | B62D 5/0406 |
| 2016/0325777 A1* | 11/2016 | Mori | H02P 25/22 |
| 2016/0373050 A1* | 12/2016 | Mori | H02P 27/08 |
| 2017/0012569 A1* | 1/2017 | Koseki | H02P 25/22 |
| 2017/0033725 A1* | 2/2017 | Koseki | B62D 5/0484 |
| 2017/0047728 A1* | 2/2017 | Benarous | H02H 3/023 |
| 2017/0070178 A1* | 3/2017 | Koseki | H02P 27/06 |
| 2017/0072946 A1* | 3/2017 | Uchida | B60W 20/50 |

* cited by examiner

CONTROL STRATEGY OF A DUAL LANE FAULT TOLERANT PERMANENT MAGNET MOTOR TO REDUCE DRAG TORQUE UNDER FAULT CONDITION

FOREIGN PRIORITY

This application claims priority to European Patent Application No. 15180405.1 filed Aug. 10, 2015, the entire contents of which is incorporated herein by reference.

TECHNICAL FIELD

The present invention is concerned with controlling a motor drive in the event of inverter switch failure.

BACKGROUND

Typical motor drive systems consist of a simple motor driven by an inverter as shown in FIG. 1. Safety critical aerospace applications require a certain number of redundancies designed into the system architecture and this cannot be achieved using the simplex motor drive architecture shown in FIG. 1.

These redundancies have been provided by multi-channel motor drive designs as shown, for example, in FIG. 2. FIG. 2 shows a dual channel three phase fault tolerant motor drive system. Other numbers of multiple channels can also be used.

To keep weight and size to the lowest level, permanent magnet motors are used since they have a very good torque/power density ratio in comparison to other motor drive alternatives such as switched reluctance or induction motors. The issue with a permanent magnet solution is that the magnets' field cannot be switched off under failure of either the motor or the drive, and one of the most severe failures is a motor winding, or inverter switch being shorted.

Multi-channel motor drive systems can be used in an active/active or active/standby configuration. In both cases if a failure occurs either within the motor or the drive circuit, then the remaining healthy channels need to maintain the functionality of the system.

In the event of an inverter switch becoming shorted in one of the channels or lanes, that particular channel or lane will be switched off or deactivated and one of the other channels or lanes, e.g. a lane which was in stand-by mode, will be (or will remain) activated to drive the motor.

Whilst this provides improved safety in the event of a failure, the deactivated, faulty channel or lane will, even though not selected to be the driving lane, still have some effect on the motor. Some current will continue to flow to the motor from this lane due to the motor windings inducing a voltage due to the rotor magnet rotational speed. The reason is that with a permanent magnet motor, the magnets' field cannot be switched off under failure of the drive. These voltages will induce currents which will induce drag torque.

Knowing this, designers of these multi-channel systems must design the channels such that if one fails, the channel (s) taking over as the driving channel(s) can compensate for this drag torque and associated power losses. In case of an inverter switch being shorted, the system will detect the failure, and the faulty inverter will be deactivated. By doing so the lane with the faulty inverter will not be able to produce positive torque, and the whole motor drive lane will be considered faulty. In order to maintain performance, the remaining healthy channels need to increase their torque by 1/n. This can be achieved by increasing the current in each channel by 1/n (if steel material saturation is ignored). In addition, however, the motor windings connected to the faulty inverter channel will induce a voltage due to the rotor magnet rotational speed. These voltages will induce currents, which will induce drag torque. This phenomenon is illustrated in FIG. 3 for a two three-phase channel motor drive system for the condition where the induced voltage of phase b is greater than that of phase a, but the idea can be generalised for any n three-phase channel system. The circulating currents will induce a drag torque that the remaining healthy channels need to overcome. FIG. 4 shows the drag torque produced from the shorted switch, and the power loss in the motor windings. This design consideration means that the drive channels have to be greater in size than if they did not have to compensate the drag torque.

The present invention aims to provide a multi-channel motor drive system for a permanent magnet motor that actually minimises drag torque when a faulty lane is deactivated, meaning that the steps needed to compensate for drag torque, in the activate lane, are less onerous and the lanes can, therefore, be smaller in size.

SUMMARY

According to an aspect of the present invention, there is provided a motor drive circuit comprising two or more inverters to provide current to a permanent magnet motor, each inverter comprising a respective switch arm comprising one or more switches, for each phase of the motor to be driven; the motor drive circuit comprising means for detecting a switch short circuit for any switch within one of the inverters and means for determining the speed of the motor, the motor drive circuit further comprising a controller configured to short circuit each switch arm of the inverter containing the switch short circuit if the motor speed exceeds a predetermined threshold, but not if the motor speed does not exceed the predetermined threshold.

According to a second aspect, the invention provides a method of controlling a motor drive circuit for driving a permanent magnet motor, the method comprising short circuiting all motor phases of a motor connected to an inverter in response to detection of both: i) a switch short circuit in any switch in the inverter, and ii) the motor speed exceeding a predetermined threshold.

According to the present invention, in the preferred embodiment, if an inverter switch is shorted due to a failure, in the first lane, this lane will be deactivated and another lane will be switched ON to drive the motor. As mentioned above, although the faulty lane has been deactivated, this will still give rise to some drag torque. According to the present invention, the motor speed is known. If the motor speed is below a given speed N_tran, the system will continue to operate as in the prior art systems, where current will be increased in the remaining healthy channel(s) to overcome drag produced by the faulty switch and maintain performance. If, on the other hand, the motor speed is greater than N_tran, according to the present invention, the other inverter switches of the faulty lane will also be closed—i.e. shorted. This reduces drag torque and minimises power loss, hence reducing the overload requirements on the remaining healthy lane(s). This topology can maintain operation until the faulty inverter is repaired.

This operation can be described with reference to FIG. 5.

BRIEF DESCRIPTION OF THE DRAWINGS

Preferred embodiments will now be described by way of example only, with reference to the drawings.

DETAILED DESCRIPTION

Figure 5:
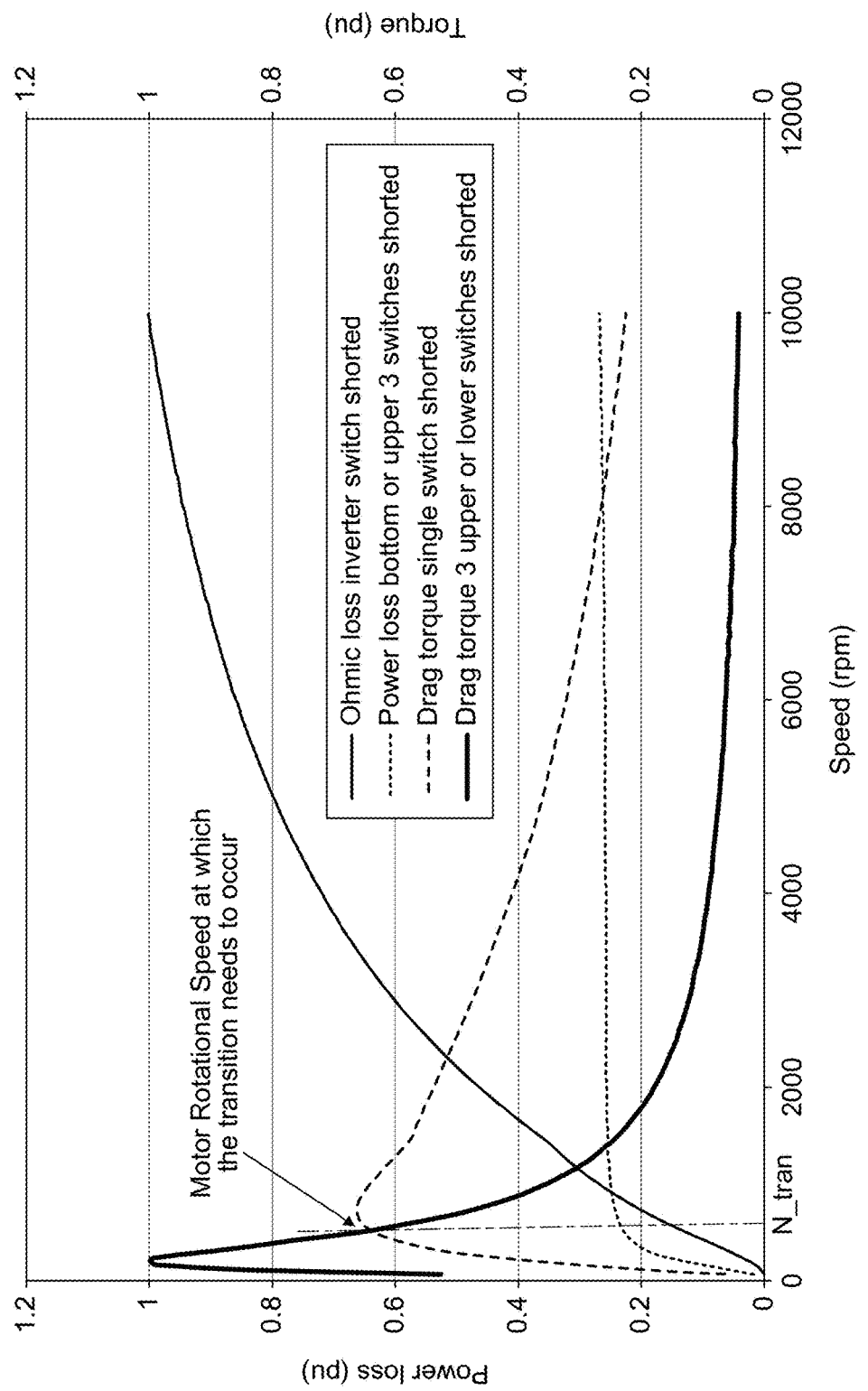

FIG. 5 shows drag torque and ohmic loss in systems operating as described in relation to the prior art, in the event of an inverter switch short-circuit failure. FIG. 5 also shows, in contrast, the ohmic loss and drag torque characteristics if the other switches of the faulty inverter are closed or shorted.

As can be seen from FIG. 5, below motor speed N_tran, the ohmic losses for a system where all of the inverter switches are shorted, in the case of a faulty inverter switch, within a given lane, are very high but, for this mode of operation, after the speed has increased to beyond N_tran, the losses sink considerably. On the other hand, for speeds below N_tran, the losses in the prior art systems are comparatively less, but are higher at higher speeds. This effect is taken into account when operating the invention such that, according to motor speed, an appropriate mode is selected. The present invention reads the motor speed and the controller decides whether to short the phases of the motor connected to the faulty inverter or continue to work as it is. The transition speed is N_trans. If the present invention were not brought into effect, at these higher speeds, an inverter switch short-circuit would result in a high level of drag torque and extremely high losses. By shorting all of the motor phases in the faulty lane, at speeds greater than N_tran, drag torque and losses are greatly reduced and the system can, accordingly, be smaller in size.

Figure 1:
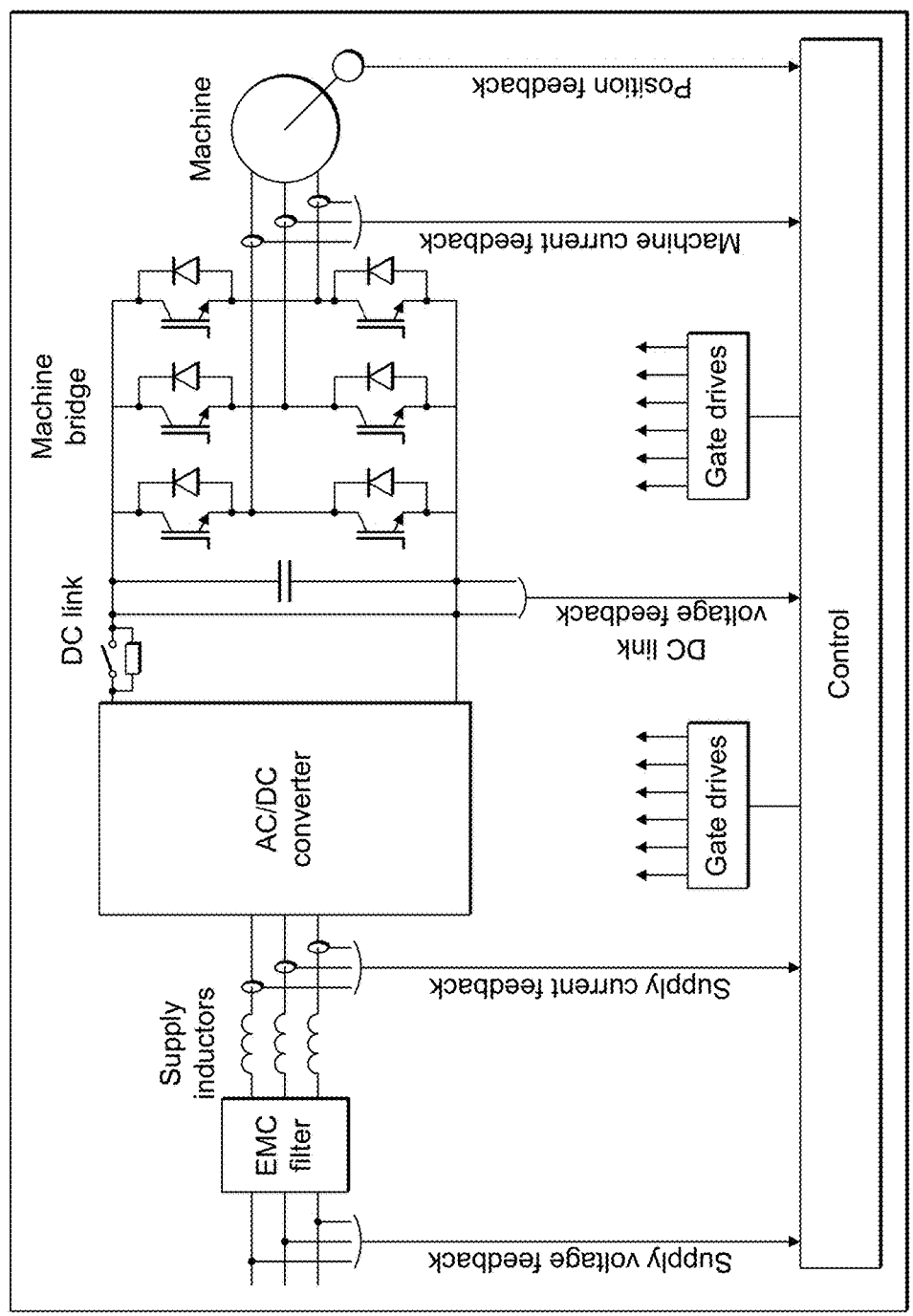
FIG. 1 is a block diagram of a typical 3-phase motor drive system.
Figure 2:
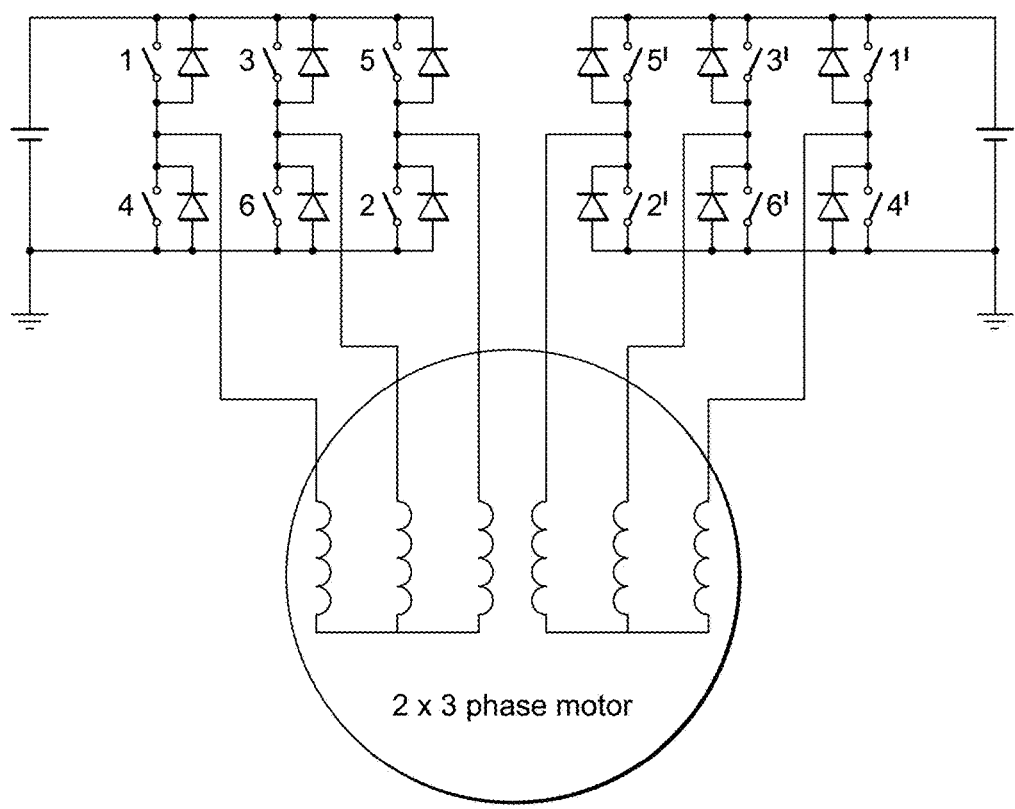
FIGS. 2 and 3 are block diagrams of a multi-channel, 3-phase (3+3) motor drive system.

If, for example, switch 1 of FIG. 2 is shorted, then by closing switches 3 and 5, the three phases of the motor will be shorted. On the other hand, if a lower switch (4, 6 or 2) is shorted, then by closing the remaining two switches on the lower leg of the inverter, the three motor phase windings are shorted.

Figure 3:
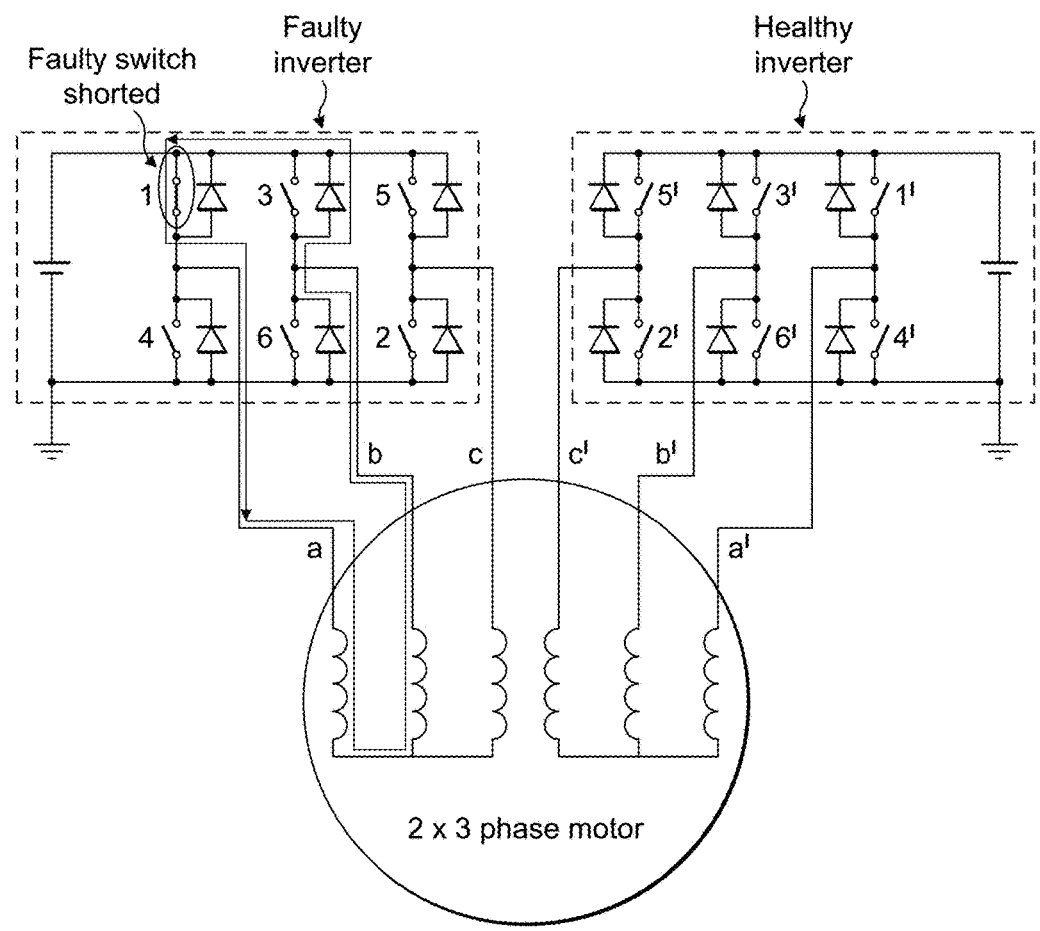
Figure 4:
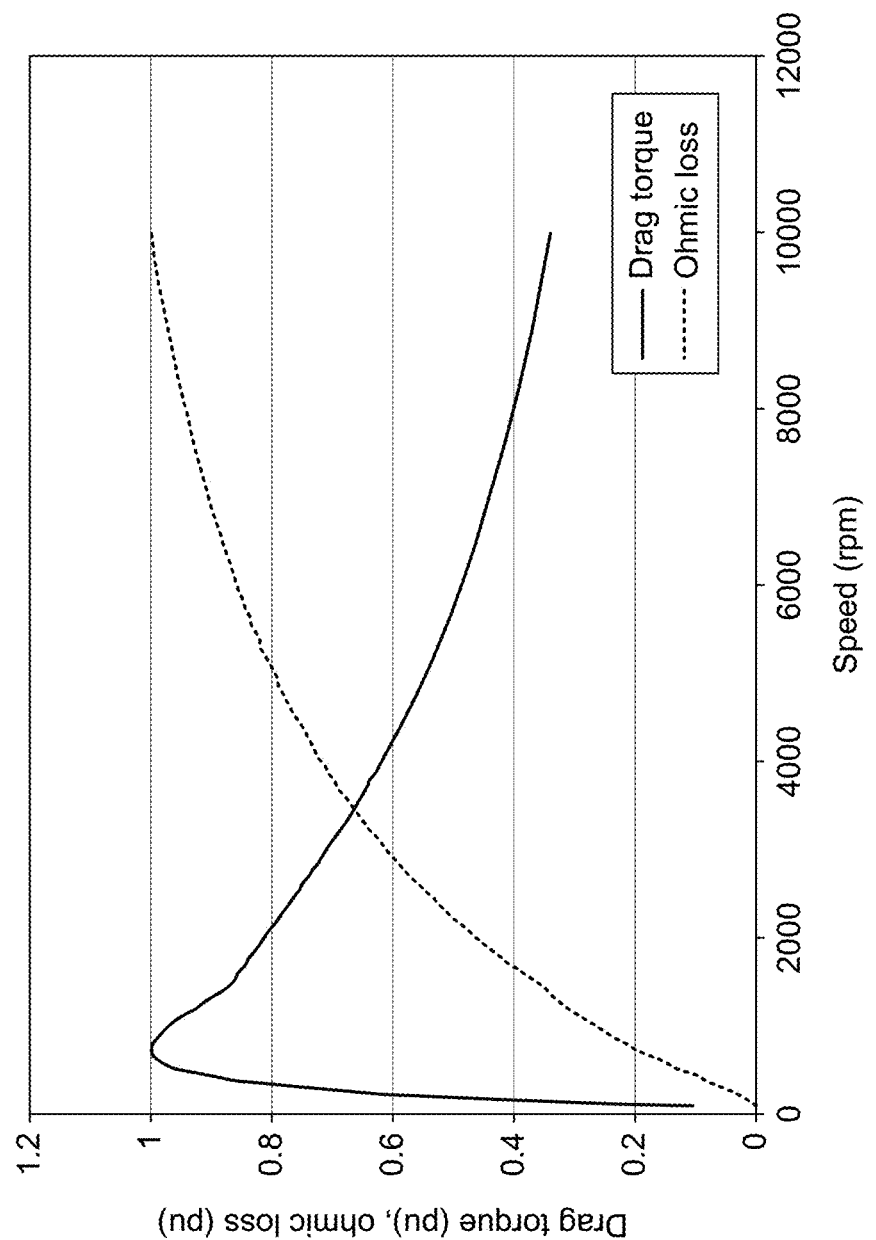
FIGS. 4 and 5 show drag torque and ohmic losses occurring when a single or three-switch short circuits.

This can also be seen with reference to FIG. 3. Here, for a three-phase motor, two inverters are provided to allow switching to a "healthy" inverter in the event of one inverter being faulty.

In the example shown, a fault—a short circuit in switch 1—is detected in the inverter shown to the left of the diagram.

This inverter is then deactivated and control is switched over to the healthy inverter.

As mentioned above, a problem is that even though the "faulty inverter" is no longer driving the motor, there will still be some residual loss and drag torque effects from it.

As can be seen in FIG. 5, and as described above, at lower motor speeds, the ohmic losses and drag torque are minimised by not closing other (non-shorted) switches of the faulty inverter, but above a certain motor speed N_tran, the loss/drag torque characteristics change and are significantly reduced if the feature of the present invention is implemented, namely that the other switches (in the example shown—switches 3 and 5) are also shorted.

Figure 6:
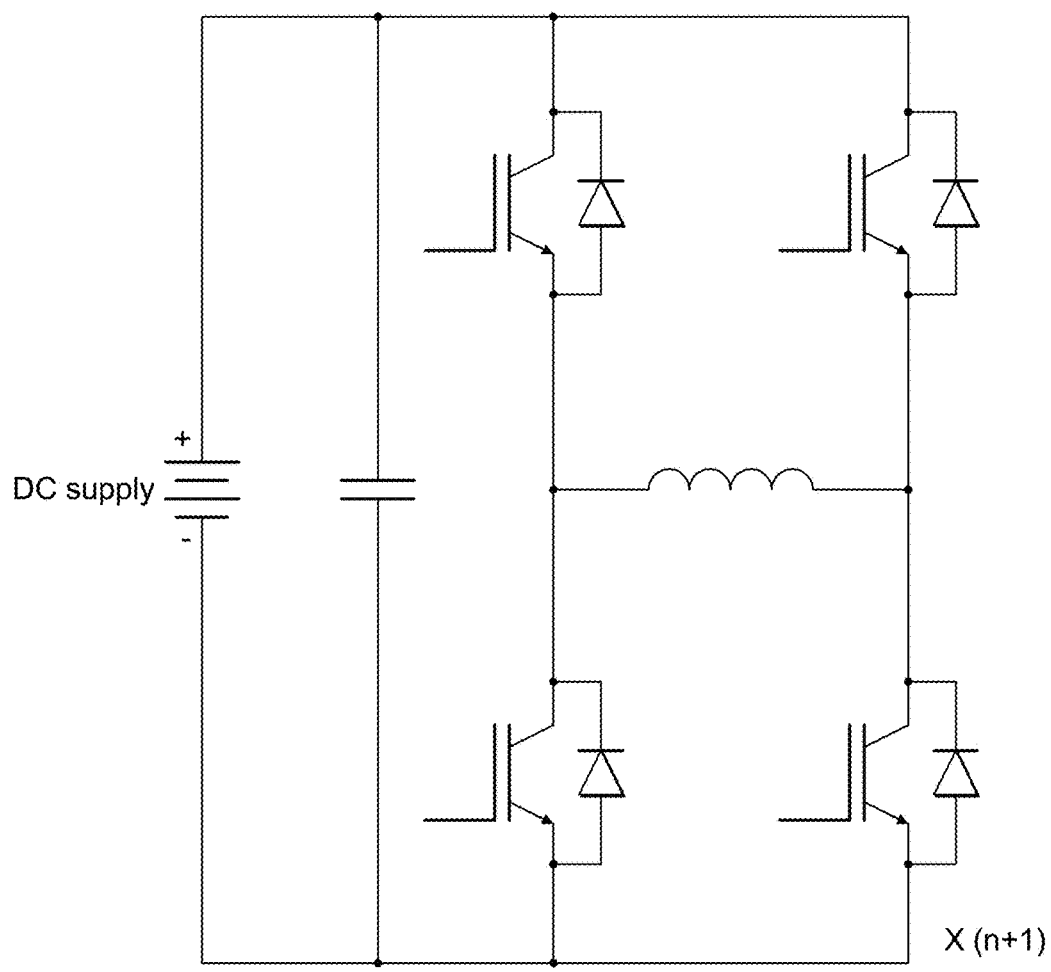
FIG. 6 is a circuit diagram for a multichannel, singe phase motor drive system.

The description is presented in relation to a so-called 3n+3 architecture, where n represents the number of channels in a multiple three phase system. The invention can also apply to n+1 architectures (as shown in FIG. 6), where n represents the number of channels in a multiple single phase system. FIG. 6, for example, shows a multi-channel drive for a single phase motor. Here, four switches are required. The general operation, however, is the same as for the multi-phase drives described above.

This method of control enables the reduction of the size and weight of the system for fault tolerant motor drive architectures.

The invention claimed is:

1. A motor drive circuit comprising:
   two or more inverters to provide current to a dual lane fault tolerant three-phase permanent magnet motor, each inverter comprising, for each phase of the motor to be driven, a respective switch arm comprising one or more switches;
   means for detecting a switch short circuit for any switch within one of the inverters;
   means for determining the speed of the motor; and
   a controller configured, in the event a switch short circuit is detected within one of the inverters, to:
   a): close all switch arms of the inverter containing the switch short circuit when the motor speed exceeds a predetermined threshold, and
   b): not to close any of the switch arms not containing the short-circuited switch if the motor speed does not exceed the predetermined threshold.

2. The motor drive circuit of claim 1, wherein each switch arm comprises two switches connected in series.

3. A method of controlling a motor drive circuit for driving a dual lane fault tolerant permanent magnet motor, the method comprising:
   monitoring the motor speed of the dual lane fault tolerant permanent magnet motor;
   detecting when a switch short circuit occurs in any switch in any of two inverters connected to the dual lane fault tolerant permanent magnet motor;
   comparing the motor speed to a predetermined threshold;
   short-circuiting all motor phases of a the dual lane fault tolerant motor connected to the inverter in response to detection of both: i) a switch short circuit in any switch in the inverter, and ii) the motor speed exceeding a predetermined threshold; and
   not short-circuiting any motor phases not containing the short-circuited switch if the motor speed does not exceed the predetermined threshold.

* * * * *